United States Patent [19]

Fleming et al.

[11] Patent Number: 5,411,575
[45] Date of Patent: May 2, 1995

[54] HYDROMETALLURGICAL EXTRACTION PROCESS

[75] Inventors: Christopher A. Fleming, Peterborough, Canada; Walther G. Grot, Chadds Ford, Pa.; John A. Thorpe, Memphis, Tenn.

[73] Assignee: E. I. Du Pont de Nemours and Company, Wilmington, Del.

[21] Appl. No.: 217,912

[22] Filed: Mar. 25, 1994

[51] Int. Cl.$^6$ ............................................. C22B 11/08
[52] U.S. Cl. .................................. 75/743; 75/735; 75/737; 423/29
[58] Field of Search .................... 75/735, 737, 743; 423/29

[56] References Cited

U.S. PATENT DOCUMENTS

| | | | |
|---|---|---|---|
| 2,112,298 | 3/1938 | Mills | 75/735 |
| 2,124,421 | 7/1938 | Klein | 75/735 |
| 4,681,628 | 7/1987 | Griffin | 75/735 |
| 5,078,977 | 1/1992 | Mudder | 75/737 |

OTHER PUBLICATIONS

Scerescini, B. "The Mt. Gibson Process". AMMTEC Pty Ltd. Processing of Gold-Copper Ores (Practical Aspects): Jul. 4, 1991, pp. 39–41.
LaBrooy, S. R. "Copper-Gold Ore Treatment Options and Status" Randol Gold Forum Vancouver '92, Randol International: Golden, Colo. pp. 173–177.
Muir, D. M., LaBroy, S. R., Fenton, K., "Processing Copper-Gold Ores with Ammonia or Ammonia-Cyanide Solutions", World Gold '91, AusIMM: Victoria, Australia, pp. 145–150.

*Primary Examiner*—Peter D. Rosenberg
*Attorney, Agent, or Firm*—George A. Frank

[57] ABSTRACT

A hydrometallurgical process for treating copper ores or concentrates containing gold by simultaneously leaching both copper and gold into an aqueous cyanide solution, recovering copper and gold in metallic form by electrowinning or cementation and regenerating cyanide ions is provided.

25 Claims, No Drawings

HYDROMETALLURGICAL EXTRACTION PROCESS

FIELD OF THE INVENTION

This invention is related to hydrometallurgical extraction processes and specifically to the extraction of copper either alone or in the presence of gold from processed ore by cyanide leaching to provide gold and copper or mixtures thereof for the metal purification step of the overall metallurgical process.

BACKGROUND ART

There are three major identifiable steps that follow the mining step in the process of obtaining pure metals and/or minerals from rock or ore. These three steps of the overall metallurgical process are mineral processing, metallurgical extraction and metal purification. Mineral processing itself is broken down into one of two steps: comminution and concentration. Metallurgical extraction can be either hydrometallurgical or pyrometallurgical while metal purification includes smelting, electrowinning or electrorefining of the product coming from the metallurgical extraction steps.

Gold ores containing high concentrations of cyanide-soluble copper minerals, e.g., chalcocite ($Cu_2S$), bornite ($FeS.2Cu_2S. CuS$), malachite [$CuCO_3.Cu(OH)_2$], azurite [$2CuCO_3, .Cu(OH)_2$], covellite ($CuS$) and cuprite ($Cu_2O$), have traditionally been difficult to treat economically, because of the high costs associated with cyanide consumption during leaching and cyanide destruction during effluent treatment. High concentrations of copper cyanide in the leach liquor can also cause a variety of metallurgical problems, whether gold is recovered by the Merrill-Crowe process, or by adsorption on activated carbon. Consequently, many gold resources that fall into this category are still lying in the ground, awaiting the development of adequate technology for their treatment.

Much research has gone into this problem over the years, and these efforts have generally focused in one of two directions: to develop other leaching chemistries for gold dissolution, i.e., lixiviants that are more selective than cyanide for gold over copper or to suppress the reaction between copper and cyanide by either physically or chemically masking the copper minerals. Neither approach has met with widespread success. This invention provides an efficient and cost effective process for treating gold ores containing high concentrations of cyanide-soluble copper minerals, as well as high copper bearing ores with negligible gold.

Hydrometallurgical extraction of copper and gold has been carried out previously by leaching the ore first with sulfuric acid to dissolve the copper minerals, followed by neutralization of the residual acid and finally by cyanidation to leach the gold. This approach does not work with the sulfide minerals such as chalcocite and bornite, which leach in cyanide solution but not in acid, is often uneconomic due to high acid, base or cyanide consumption, and prolonged leaching times required for two stages of leaching, and is often impractical because of physical changes brought about in the rock by acid treatment. There is a need for a process for treating copper-bearing ores or concentrates containing gold by simultaneously leaching both metals, gold and copper, into an aqueous cyanide solution, recovering copper and gold in metallic form and regenerating cyanide ions in an economically efficient process.

SUMMARY OF THE INVENTION

The process of this invention is a hydrometallurgical extraction process for treating ores containing copper alone or gold and copper comprising the steps of:

(a) treating said ores with an aqueous cyanide solution having a molar ratio of CN:Cu of $>3.5:1$ thereby simultaneously leaching both copper and gold and reducing the molar ratio of CN:Cu in the pregnant leach solution to $\leq 4:1$; and (b) removing and recovering copper from the solution resulting from step (a).

Gold can be recovered at various points in the hydrometallurgical extraction process of this invention.

DETAILED DESCRIPTION OF THE INVENTION

The hydrometallurgical extraction process can begin by leaching "heaps", which is the leaching of coarse ore by percolating leach solutions through the heaps, or by "milling", which is the leaching of finely ground ore by a process of mixing or agitation of the ore with a leach solution in tanks. Milling can be a two-step process of first grinding the coarse ore and then leaching. Alternatively, leaching can begin in the grinding step.

The process of this invention can be broadly described as treating copper ores or concentrates optionally containing gold in a hydrometallurgical process by simultaneously leaching both copper and gold into an aqueous cyanide solution, recovering copper and gold in metallic form and regenerating $CN^-$ ion. This process is capable of recovering gold and copper from ores containing low concentrations of these metals and, therefore, can help eliminate the flotation step in the conventional process for treating sulfidic copper and copper/gold ores.

To obtain high leaching efficiency for both copper and gold there is a process of this invention of leaching ores containing copper and gold with a cyanide solution (having a CN:Cu ratio of $>4$) such that the molar ratio of cyanide to copper (CN:Cu) in the pregnant leach solution is not less than 4:1. The pregnant leach solution is understood to mean the solution coming from the heap, vat or the milled leach slurry. (A hybrid process of heap-leaching and milling used occasionally is called vat-leaching.)

CN:Cu ratio is defined as the number of moles of $(CN)^-$ complexed with each mole of $Cu^+$ in a solution plus the number of free $(CN)^-$ ions not complexed with another metal or hydrogen ion.

One approach to obtaining gold from the pregnant leach solution is another process of this invention for the recovery of gold by cementation of gold on copper metal comprising the steps of:

(a) contacting a solution containing gold cyanide and copper cyanide wherein the CN:Cu ratio is not less than 3.5:1 with either copper metal powder or copper metal which has been electrodeposited on a high surface area cathode thereby producing a cemented product of gold metal on copper metal; and (b) recovering gold from the cemented product by electrorefining or smelting.

Because the above process leaves behind substantially the same CN:Cu ratio of $\geq 3.5$, one can arrive at a further process of this invention for preparing a solution useful in the recovery of copper having a CN:Cu ratio of $\leq 3:1$, comprising the steps of:

(a) treating the pregnant solution with an acid to reduce the pH of the solution to between 3 and 7 such that the predominant copper cyanide species is $Cu(CN)_2^-$ and little or no CuCN is precipitated;

(b) optionally removing substantially all HCN gas generated in step (a) by passing a gas through the solution, and (c) contacting the solution with strong base ion exchange resin or carbon for removal of $Cu(CN)_2^-$ from the solution.

This process can be represented by the equation:

$$Cu(CN)_4^{3-} + 2H^+ \rightarrow Cu(CN)_2^{1-} + 2HCN.$$

The above process can comprise the additional step of treating the gas or liquid stream containing HCN with an aqueous alkaline solution to generate cyanide ion ($CN^-$) for recycling into a high leaching efficiency cyanide solution to be used subsequently for leaching both copper and gold.

As an alternative to the above process there is a further process of this invention for preparing a solution useful in the recovery of copper by electrowinning having a CN:Cu ratio of $\leq 4:1$ comprising the steps of:

(a) treating a portion of the pregnant leach solution with an acid to reduce the pH of the solution to between 1.5–2.0;

(b) removing the copper cyanide (CuCN) precipitate so formed;

(c) optionally removing substantially all HCN gas generated in step (a) above by passing a gas through the solution; and (d) combining the CuCN precipitate with that portion of the pregnant solution which had not been acidified in step (a) and with a portion of the electrowinning cell catholyte which is recirculated to the cell cathodes.

This process can be represented by the equation:

$$Cu(CN)_4^{3-} + 2CuCN \rightarrow 3\, Cu(CN)_2^{1-}$$

Electrowinning is defined as the deposition of a metal on a cathode from a solution of the metal in the form of a metal salt.

Alternatively, CuCN is combined only with the unacidified pregnant solution or the recirculated catholyte.

The above process can comprise the additional step of treating the gas stream containing HCN or the acidified solution containing HCN (if the HCN is not removed) with an aqueous alkaline solution to generate $CN^-$ ion for recycling into a high leaching efficiency cyanide solution for subsequent use in leaching both copper and gold.

One preferred process of this invention for preparing a solution useful in the recovery of copper having a CN:Cu ratio of $\leq 4:1$ comprising the steps of:

(a) contacting the pregnant leach solution (with or without gold present) with unleached coarse or finely ground ore containing copper and, optionally, gold thereby reducing the CN:Cu ratio to $\leq 4:1$; and (b) separating the resulting solution from the partially leached ore thereby producing a solution suitable for recovery of copper and a leached ore from which copper has been partially leached.

This ore which results from the above process, then is returned to the process described initially wherein the ore (containing copper and gold) is leached with a cyanide solution such that the molar ratio of cyanide to copper in the pregnant leach solution is not less than 3.5:1.

After the leaching steps described above and the processes wherein the CN:Cu ratio is reduced to $\leq 4:1$, the hydrometallurgical extraction processes of this invention are applied to the recovery processes for copper and optionally gold and to purge unwanted species from solution.

A process for the direct recovery of copper by electrowinning from a solution containing copper cyanide at a CN:Cu ratio of $\leq 4:1$ (and optionally containing gold) prepared by the above described processes of this invention comprises the steps of:

(a) passing the solution as the electrolyte (catholyte) through a compartment containing the cathode(s);

(b) plating copper metal on the surface of the cathode(s) in an electrowinning cell wherein the anode(s) are kept isolated from the catholyte by a cation exchange membrane thereby preventing anodic oxidation of cyanide ions; and (c) recovering the copper from the cathode(s) by stripping from the cathode surfaces or by smelting.

A preferred cation exchange membrane is Nafion ® perfluorosulfonic acid membrane (a registered trademark of E. I. du Pont de Nemours and Company). It is preferred that this copper recovery process be carried out at high current efficiency and high current density (amps/m$^2$ of cathode surface).

The above direct copper recovery process can be preferably carried out in such a way that the electrolyte in the anode compartment (anolyte) is maintained at a pH $>7$ by the addition of a base or basic salt thereby preventing the build-up of H$^+$ ions in the anode compartment. Such base or basic salt can be sodium hydroxide or sodium carbonate. Preventing the build-up of H$^+$ ions prevents the migration of such H$^+$ ions through the membrane thereby avoiding the formation of HCN in the catholyte.

In a refinement of the above copper recovery process, the anode compartments are filled with a dilute mineral acid such as sulfuric acid and allowing H$^+$ ions to form at the anodes and migrate to the catholyte. Any HCN formed can be left in solution and converted to cyanide ion by the addition of alkali to the catholyte or the cell effluent or removed from the catholyte or cell effluent and converted to cyanide ion for use. Formation of HCN can be prevented by maintaining the catholyte pH high ($\geq 10.5$) at all points in the cell.

A further refinement of the above copper recovery process is an alternative process of this invention wherein the anode is a hydrogen gas diffusion electrode wherein H$_2$ is provided and consumed in the anodic reaction thereby preventing the oxidation of cyanide ions at the anodes. This process does not use membranes.

Other refinements of the above copper recovery process can minimize anodic cyanide oxidation by using unprotected anodes and allowing $(SCN)^-$ to oxidize at the anodes thus reducing the oxidation of cyanide ions and by using diaphragms to minimize mass transfer at the anodes thereby starving the anodes for cyanide ion and minimizing cyanide oxidation.

An alternative to the above direct metal recovery mode of recovering copper from a solution in the copper recovery process is the following process of the invention.

A process for the recovery of copper from a solution produced by the processes of this invention containing copper cyanide at a CN:Cu ratio of ≦3:1 (optionally containing gold) whereby the copper is preconcentrated by adsorption on a strong base or weak base anion exchange resin comprising the steps of:

(a) contacting the solution with an anion exchange resin thereby selectively adsorbing copper cyanide at a CN:Cu ratio of <3:1 onto the resin wherein gold, if present, is adsorbed to a limited equilibrium level (an insignificant portion of the gold present in the solution) which does not interfere with the adsorption of copper;

(b) separating the resin having copper cyanide adsorbed thereon from the now partially depleted solution containing copper cyanide at a CN:Cu ratio of >3;

(c) treating the loaded resin obtained in step (b) above with an eluant containing copper cyanide at a CN:Cu ratio of between 3.5:1 and 4:1 and a copper concentration of at least 10 grams/liter (this copper concentration being such that the subsequent electrowinning step can be operated at a maximum current efficiency) thereby eluting copper cyanide from the resin to the extent of approximately 50% of the copper on the resin and producing an eluate solution having a CN:Cu ratio of less than 4:1; and (d) electrowinning copper metal from the eluate produced in step (c) above by the process of this invention described above for the recovery of copper.

Alternatively and in the event more efficient removal of copper from the resin described above is desired, see applicants' copending application Ser. No. 08/126,661, filed on Sep. 27, 1993, incorporated herein by reference. Such a more efficient removal of copper may be desirable in situations where the leach solution is produced by the milling/leaching process of finely ground ore.

Yet another process of this invention for the recovery of copper from solution is a process wherein the copper in the solution containing copper cyanide at a CN:Cu ratio of <3 (optionally containing gold) is preconcentrated by adsorption on a strong base or weak base anion exchange resin comprising the steps of:

(a) contacting the solution with an anion exchange resin thereby selectively adsorbing copper cyanide at a CN:Cu ratio of <3:1 onto the resin wherein gold, if present, is adsorbed to a limited equilibrium level (an insignificant portion of the gold present in the solution) which does not interfere with the adsorption of copper;

(b) separating the resin having copper cyanide adsorbed thereon from the now partially depleted solution containing copper cyanide at a CN:Cu ratio of >3:1;

(c) treating the loaded resin obtained in step (b) above with an aqueous solution of chloride ions thereby removing copper cyanide from the resin;

(d) adsorbing the copper cyanide from the solution generated in step (c) onto activated carbon; and (e) treating the loaded carbon obtained in step (d) with an eluent containing copper cyanide at a CN:Cu ratio of between 3.2:1 and 3.5:1 and a copper concentration of at least 10 grams/liter thereby eluting copper cyanide from the carbon and producing an eluate having a CN:Cu ratio of less than 3.5:1.

A refinement of the above process comprises loading a solution containing copper cyanide at a CN:Cu ratio of ≧3:1 on the resin followed by the steps of:

(a) treating the loaded resin so obtained with an acid to generate HCN and thereby reducing the CN:Cu ratio remaining on the resin to approximately 2:1;

(b) separating the solution containing HCN from the resin;

(c) treating the loaded resin obtained in step (b) with an aqueous solution of chloride ions thereby removing copper cyanide from the resin;

(d) adsorbing the copper cyanide from the solution generated in step (c) onto activated carbon; and (e) treating the loaded carbon according to step (e) described in the previous process.

The HCN solution obtained in step (b) can be treated with alkali to regenerate $CN^-$ ions for further use.

Yet another alternative process of this invention for the recovery of copper is a process analogous to the recovery of copper by preconcentration on an anion exchange resin wherein a strong base or a weak base anion exchange solvent is utilized instead of an anion exchange resin. These solvents include tertiary amines or quartenary amines.

Copper so obtained by the hydrometallurgical extraction processes of this invention is now ready for the elution and electrowinning steps to complete the overall metallurgical process.

The following process of this invention allows the recovery of gold. Such process allows the recovery of gold from gold cyanide which is present in the solution produced when gold was optionally present. This process of the invention for recovering gold from gold cyanide adsorbed on an anion exchange resin or solvent, resulting from a contact between a solution containing gold cyanide and an anion exchange resin or solvent, comprises the steps of:

(a) contacting the loaded resin or solvent having gold cyanide and copper cyanide adsorbed thereon with an eluant solution containing copper cyanide at a CN:Cu ratio of approximately 4:1 and a copper concentration of approximately 20 to 40 grams per liter thereby eluting gold cyanide from the resin or solvent; and (b) removing gold metal from the eluate by cementation on copper metal powder or copper plated onto a high surface area substrate or by electrowinning.

In this process the CN:Cu ratio is ≧4:1 and, therefore, copper cannot be isolated efficiently by electrowinning.

The following process of this invention allows for the purging of unwanted moieties ($OCN^-$, $SCN^-$, $Cl^-$, $SO_4^{2-}$, $Fe(CN)^{4-}_6$, $Zn(CN)^{2-}_4$, etc.) while retaining gold, copper and cyanide, and comprises the steps of:

(a) contacting a bleed stream of solution containing gold cyanide and copper cyanide and various unwanted ions wherein the CN:Cu ratio is at its lowest point in the circuit (and preferably <3:1) with activated carbon, thereby selectively adsorbing gold cyanide and copper cyanide onto the activated carbon;

(b) separating the activated carbon having gold cyanide and copper cyanide adsorbed thereon from the now gold, copper and cyanide depleted leach solution containing the unwanted ions;

(c) treating the activated carbon having gold cyanide and copper cyanide adsorbed thereon with an aqueous cyanide solution at a temperature of not less than 100° C.; and (d) recycling the eluate solution to the leaching step in the process.

We claim:

1. A hydrometallurgical extraction process for treating ores containing gold and copper resulting in the recovery of both gold and copper as metals comprising the steps of:

(a) treating said ores with an aqueous cyanide solution having a molar ratio of CN:Cu of >4 thereby simultaneously leaching both copper and gold such that the molar ratio of CN:Cu in the pregnant leach solution is not less than 4:1;

(b) removing and recovering substantially all gold from the pregnant leach solution;

portion of the pregnant leach solution with an acid to reduce the pH of the solution to between 1.5–2.0, removing CuCN precipitate formed and combining the CuCN precipitate with the untreated portion of the pregnant leach solution or by contacting the pregnant leach solution with unleached coarse or finely ground ore containing copper; and (d) removing and recovering copper from the solution resulting from step (c).

2. A process for the recovery of gold from pregnant leach solution by cementation of gold on copper metal comprising the steps of:

(a) contacting a solution containing gold cyanide and copper cyanide wherein the CN:Cu ratio is not less than 3.5:1 with either copper metal powder or copper metal which has been electrodeposited on a high surface area cathode thereby producing a cemented product of gold metal on copper metal; and (b) recovering gold from the cemented product by electrorefining or smelting.

3. The process of claim 1 for preparing a solution useful in the recovery of copper by lowering said CN:Cu ratio of >4 in the pregnant leach solution to having a CN:Cu ratio of <3:1 comprising the steps of:

(a) treating the pregnant solution with an acid to reduce the pH of the solution to between 3 and 7 such that the predominant copper cyanide species is $Cu(CN)_2^-$ and little or no CuCN is precipitated;

(b) contacting the solution with strong base ion exchange resin or carbon for removal of $Cu(CN)_2^-$ from the solution.

4. A process for preparing a solution having a CN:Cu ratio of ≦4:1 useful in the recovery of copper by electrowinning comprising the steps of:

(a) treating a portion of a pregnant leach solution with an acid to reduce the pH of the solution to between 1.5–2.0;

(b) removing the copper cyanide (CuCN) precipitate so formed; and (c) combining the CuCN precipitate with that portion of the pregnant solution which had not been acidified in step (a) and/or with a portion of the electrowinning cell catholyte which is recirculated to the cell cathodes.

5. The process of claim 3 comprising the additional step of treating the solution containing HCN from which $Cu(CN)_2^-$ has been removed with an aqueous alkaline solution to generate cyanide ion for use in cyanide leaching solution.

6. A process for preparing a solution having a CN:Cu ratio of ≦4:1 useful in the recovery of copper by electrowinning comprising the steps of:

(a) treating a portion of a pregnant leach solution with an acid to reduce the pH of the solution to between 1.5–2.0;

(b) removing the copper cyanide (CuCN) precipitate so formed;

(c) removing substantially all HCN gas generated in step (a) above by passing a gas through the solution; and (d) combining the CuCN precipitate with that portion of the pregnant solution which had not been acidified in step (a) and/or with a portion of the electrowinning cell catholyte which is recirculated to the cell cathodes.

7. The process of claim 6 comprising the additional step of treating the gas or liquid stream containing HCN with an aqueous alkaline solution to generate $CN^-$ for recycling into a high leaching efficiency cyanide solution for subsequent use in leaching both copper and gold.

8. A process for preparing a solution useful in the recovery of copper having a CN:Cu ratio of ≦4:1 comprising the steps of:

(a) contacting a pregnant leach solution with unleached coarse or finely ground ore containing copper thereby reducing the CN:Cu ratio to ≦4:1; and (b) separating the resulting solution from the partially leached ore thereby producing a solution suitable for recovery of copper and a leached ore from which copper has been partially leached.

9. The process of claim 1 wherein the ore to be extracted is an ore from which copper has been partially leached.

10. A process for the direct recovery of copper by electrowinning from a solution containing copper cyanide at a CN:Cu ratio of ≦4 comprising the steps of:

(a) passing the solution as the catholyte through a compartment containing the cathode(s);

(b) plating copper metal on the surface of the cathode(s) in an electrowinning cell wherein the anode(s) are kept isolated from the catholyte by a cation exchange membrane thereby preventing anodic oxidation of cyanide ions; and (c) recovering copper from the cathode(s) by stripping from the cathode surfaces or by smelting.

11. The process of claim 10 wherein the cation exchange membrane is a perfluorosulfonic acid-based membrane.

12. The process of claim 10 wherein the anode compartment is maintained at pH >7 by the addition of base or basic salt.

13. The process of claim 10 wherein the anode is a hydrogen gas diffusion electrode wherein $H_2$ is provided and consumed in the anodic reaction thereby preventing the oxidation of $CN^-$ ions at the anode.

14. A process for the recovery of copper from a solution containing copper cyanide at a CN:Cu ratio of ≦3 whereby copper is preconcentrated by adsorption on an anion exchange resin comprising the steps of:

(a) contacting the solution with an anion exchange resin thereby selectively adsorbing copper cyanide at a CN:Cu ratio of <3:1 onto the resin wherein gold, if present, is adsorbed to a limited equilibrium level which does not interfere with the adsorption of copper;

(b) separating the resin having copper cyanide adsorbed thereon from the now partially depleted solution containing copper cyanide at a CN:Cu ratio of >3:1;

(c) treating the loaded resin obtained in step (b) above with an eluant containing copper cyanide at a CN:Cu ratio of between 3.5:1 and 4:1 and a copper concentration of at least 10 grams/liter thereby partially eluting copper cyanide from the resin and producing an eluate having a CN:Cu ratio of less than 4:1; and (d) electrowinning copper metal from the eluate produced in step (c).

15. The process of claim 14 wherein electrowinning of copper is carried out by
   (a) passing the eluate as the catholyte through a compartment containing the cathode(s);
   (b) plating copper metal on the surface of the cathode(s) in an electrowinning cell wherein the anode(s) are kept isolated from the catholyte by a cation exchange membrane thereby preventing anodic oxidation of cyanide ions; and
   (c) recovering copper from the cathode(s) by stripping from the cathode surfaces or by smelting.

16. The process of claim 15 wherein the anode compartment is maintained at pH >7 by the addition of base or basic salt.

17. The process of claim 14 wherein the electrowinning of copper is carried out by
   (a) passing the eluate as the catholyte through a compartment containing the cathode(s);
   (b) plating copper metal on the surface of the cathode(s) in an electrowinning cell wherein the anode(s) is a hydrogen gas diffusion electrode; and
   (c) recovering copper from the cathode(s) by stripping from the cathode surfaces or by smelting.

18. A process for the recovery of copper from a solution containing copper cyanide at a CN:Cu ratio of <3:1 whereby copper is preconcentrated by adsorption on an anion exchange resin comprising the steps of:
   (a) contacting the solution with an anion exchange resin thereby selectively adsorbing copper cyanide at a CN:Cu ratio of <3:1 onto the resin wherein gold, if present, is adsorbed to a limited equilibrium level which does not interfere with the adsorption of copper;
   (b) separating the resin having copper cyanide adsorbed thereon from the now partially depleted solution containing copper cyanide at a CN:Cu ratio of >3:1;
   (c) treating the loaded resin obtained in step (b) with an aqueous solution of chloride ions thereby removing copper cyanide from the resin;
   (d) adsorbing the copper cyanide from the solution generated in step (c) onto activated carbon; and
   (e) treating the loaded carbon obtained in step (d) with an eluant containing copper cyanide at a CN:Cu ratio of between 3.2:1 and 3.5:1 and a copper concentration of at least 10 grams/liter thereby eluting copper cyanide from the carbon and producing an eluate having a CN:Cu ratio of less than 3.5:1; and
   (f) electrowinning copper metal from the eluate produced in step (e).

19. A process for the recovery of copper from a solution containing copper cyanide at a CN:Cu ration of ≧3:1 whereby copper is preconcentrated by adsorption on an anion exchange resin comprising the steps of:
   (a) contacting the solution with an anion exchange resin thereby selectively adsorbing copper cyanide onto the resin wherein gold, if present, is adsorbed to a limited equilibrium level which does not interfere with the adsorption of copper;
   (b) separating the resin having copper cyanide adsorbed thereon from the now partially depleted solution containing copper cyanide at a CN:Cu ratio of >3:1;
   (c) treating the loaded resin with an acid to generate HCN and thereby reducing the CN:Cu ratio on the resin to approximately 2:1;
   (d) separating the solution containing HCN from the resin;
   (e) treating the loaded resin obtained in step (d) with an aqueous solution of chloride ions thereby removing copper cyanide from the resin;
   (f) adsorbing the copper cyanide from the solution generated in step (e) onto activated carbon;
   (g) treating the loaded carbon obtained in step (f) with an eluant containing copper cyanide at a CN:Cu ratio of between 3.2:1 and 3.5:1 and a copper concentration of at least 10 grams/liter thereby eluting copper cyanide from the carbon and producing an eluate having a CN:Cu ratio of less than 3.5:1; and
   (h) electrowinning copper metal from the eluate produced in step (g).

20. A process for the recovery of copper from a solution containing copper cyanide at a CN:Cu ratio of ≦3 whereby copper is preconcentrated by extracting with an anion exchange solvent comprising the steps of:
   (a) contacting the solution with an anion exchange solvent thereby selectively loading copper cyanide at a CN:Cu ratio of <3:1 into the solvent wherein gold, if present, is loaded to a limited equilibrium level which does not interfere with the extraction of copper;
   (b) separating the solvent having copper cyanide loaded therein from the now partially depleted solution containing copper cyanide at a CN:Cu ratio of >3:1;
   (c) treating the loaded solvent obtained in step (b) with an eluent containing copper cyanide at a CN:Cu ratio of between 3.5:1 and 4:1 and a copper concentration of at least 10 grams/liter thereby eluting copper cyanide from the solvent and producing an eluate having a CN:Cu ratio of less than 4:1; and
   (d) electrowinning copper metal from the eluate produced in step (c).

21. A process for recovering gold from gold cyanide adsorbed on an anion exchange resin or solvent resulting from contact between a solution containing gold cyanide and an anion exchange resin or solvent comprising the steps of:
   (a) contacting the loaded resin or solvent having gold cyanide and copper cyanide adsorbed thereon with an eluent solution containing copper cyanide at a CN:Cu ratio of approximately 4:1 and a copper concentration of approximately 20 to 40 grams per liter thereby eluting gold cyanide from the resin or solvent; and
   (b) removing gold metal from the eluate by cementation on copper metal powder or copper plated onto a high surface area substrate or by electrowinning.

22. A process for purging unwanted moieties during a hydrometallurgical process for recovering gold and copper from ores comprising the steps of:
   (a) contacting a solution containing gold cyanide, copper cyanide and unwanted moieties produced during the hydrometallurgical process at a stage of said process wherein the CN:Cu ratio is <3.1 with activated carbon thereby selectively adsorbing gold cyanide and copper cyanide thereon; and
   (b) separating the activated carbon having gold cyanide and copper cyanide adsorbed thereon from the now gold, copper and cyanide depleted leach solution containing the unwanted ions.

23. A hydrometallurgical extraction process for treating ores containing gold and copper resulting in the recovery of both gold and copper as metals comprising the steps of:
(a) treating said ores with an aqueous cyanide solution having a molar ratio of CN:Cu of >4 thereby simultaneously leaching both copper and gold such that the molar ratio of CN:Cu in the pregnant leach solution is not less than 4:1;
(b) lowering the CN:Cu ratio of >4 in the pregnant leach solution to a ratio of ≦4:1 by treating a portion of the pregnant leach solution with an acid to reduce the pH of the solution to between 1.5–2.0, removing CuCN precipitate formed, removing substantially all HCN gas generated by passing a gas through the solution and combining the CuCN precipitate with the untreated portion of the pregnant leach solution or by contacting the pregnant leach solution with unleached coarse or finely ground ore containing copper; and
(c) removing and recovering copper from the solution resulting from step (b).

24. The process of claim 3 comprising the additional step of removing substantially all HCN gas generated in step (a) by passing a gas through the solution.

25. The process of claim 24 comprising the additional step of treating the gas stream containing HCN with an aqueous alkaline solution to generate cyanide ion for use in cyanide leaching solution.

* * * * *

UNITED STATES PATENT AND TRADEMARK OFFICE
CERTIFICATE OF CORRECTION

PATENT NO. : 5,411,575

DATED : May 2, 1995

INVENTOR(S) : Christopher A. Fleming, Walther G. Grot, John A. Thorpe

It is certified that error appears in the above-identified patent and that said Letters Patent is hereby corrected as shown below:

Column 7, between lines 7 and 8:

Insert into Claim 1, after "(b) removing and recovering substantially all gold from the pregnant leach solution;" the following:

--- (c) lowering the CN:Cu ratio of $>4$ in the pregnant leach solution to a ratio of $\leq 4:1$ by treating a ----.

Signed and Sealed this

Fourteenth Day of November, 1995

Attest:

BRUCE LEHMAN

*Attesting Officer*    *Commissioner of Patents and Trademarks*